Sept. 2, 1969  S. R. GIFFORD  3,464,371

DISPOSABLE PALLET

Filed Dec. 21, 1967

Inventor:
Sheldon R. Gifford,
by Howard D. Schlanker
His Attorney.

United States Patent Office 3,464,371
Patented Sept. 2, 1969

3,464,371
DISPOSABLE PALLET
Sheldon R. Gifford, Scotia, N.Y., assignor to General
Electric Company, a corporation of New York
Filed Dec. 21, 1967, Ser. No. 692,569
Int. Cl. B65d 19/38, 19/00
U.S. Cl. 108—57                                    1 Claim

ABSTRACT OF THE DISCLOSURE

A disposable fiberboard pallet has an inner generally planar structure with a plurality of integrally formed runners reinforced with fiberboard and a fiberboard envelope surrounding the inner structure.

---

This invention relates to pallets of fiberboard which are characterized by improved strength and are disposable.

The use of pallets in handling and storing goods has become widespread and has led to the use of many and varied types of such structures. Generally, such pallets are made of wood having runners of relatively substantial size for receiving the forks of lift trucks and one or two decks fixed to the runners to serve as a platform for the goods to be carried and for reinforcing purposes. In addition to consuming materials which could be better used for other purposes, such wooden pallets are relatively expensive and generally represent a total loss when they are shipped from one location to another. Even where the pallets are retained within a relatively small territory, the cost of returning them to their point of origin represents a substantial expense.

While attempts have been made to construct such pallets of fiberboard, they are usually satisfactory only where the loads are relatively light. Reinforcing of fiberboard pallets with metal or wood makes their cost once again approach that of the all-wooden or metal article. From the above it will be quite evident that there is a need for large weight-carrying pallets such as those of fiberboard which can be used once and then economically disposed of.

Briefly, the present invention consists of a pallet made of fiberboard which may be corrugated, having an inner structure which is generally planar and has a plurality of integrally formed runners reinforced with fiberboard, the inner structure being surrounded by an enveloping fiberboard structure, the whole being fixed together into a unitary structure.

Those features of the invention which are believed to be novel are set forth with particularity in the claim appended hereto. The invention will, however, be better understood and further advantages and benefits thereof appreciated from a consideration of the following description and drawings in which FIGURES 1 through 3 show various exemplary embodiments of the invention.

Any of a number of fiberboard materials can be used in conjunction with the present invention. Preferably, though not necessarily, corrugated fiberboard is used with the corrugations being so oriented throughout the structure as to impart maximum strength and load carrying ability. In some cases, multiple plies of corrugated fiberboard may be indicated for all parts of the structure as well as the runner reinforcement.

Figure 1:
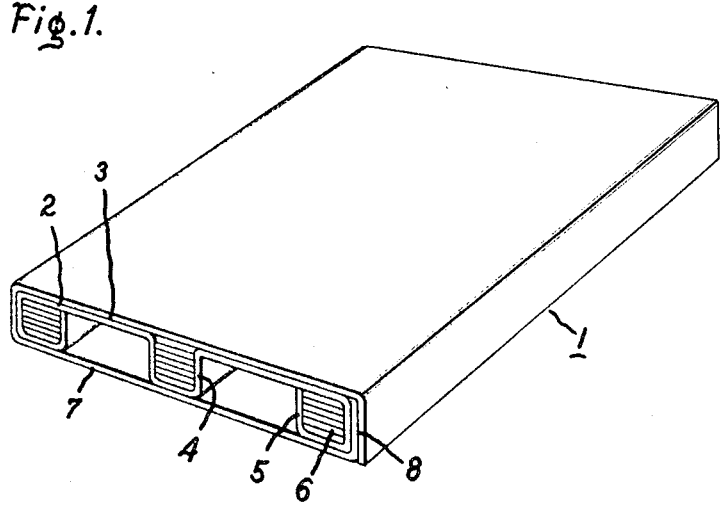

Referring to the drawing, there is shown in FIGURE 1 a pallet 1 according to the present invention having an inner structure 2 having generally planar portions 3 and integrally formed channels or runners 4 and 5, which are formed by suitably bending the inner structure 2 to the form shown. Other configurations of channels will occur to those skilled in the art. The runners are reinforced with laid-up strips 6 of fiberboard or other suitable material, the strips being fixed together as with an adhesive and filling all or a part of the length of the runner. The reinforcement itself is preferably bonded or otherwise fixed to the channel structure. Surrounding the inner runnered structure is an envelope 7 of fiberboard which is glued or otherwise fixed to the inner structure and overlapped and sealed together as at 8. While the various parts of the pallet can be stapled together, it is preferred that all parts be bonded together with a weather-resistant adhesive of any of a number of well known types. In addition, where the pallet is to be exposed to moisture or the elements, either the individual parts separately, or the entire pallet, can be treated with a water-proofing material such as ceraceous material or a suitable plastic coating and impregnating material.

Figure 2:
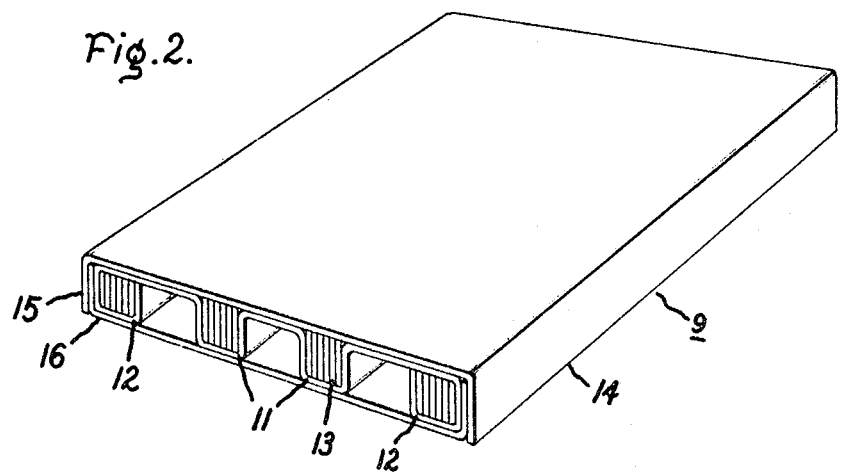
Figure 3:
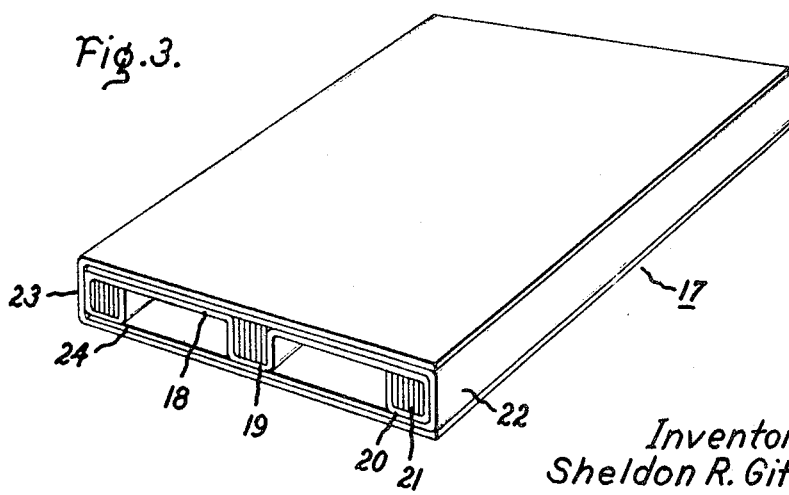

A modification of the pallet of FIGURE 1 is shown at 9 in FIGURE 2. Here the inner structure has an increased number of runners 11 and 12 which enable the pallet to support a greater weight. In addition, the runner reinforcing strips 13 are vertically disposed with their corrugations also vertical to increase the load bearing capacity of the runners. The outer envelope 14 is made up of two over-folding parts 15 and 16 having double thicknesses at the edges which again contribute to greater weight bearing capacity.

Shown in FIGURE 3 is a still further modification 17 of the pallet in which the inner structure 18 is similar to that of FIGURE 1 with respect to its runners 19 and 20 with the runner reinforced strips 21 being vertically disposed as in the structure of FIGURE 2 for greater load carrying capacity. Here the outer structure 22 has two interleaving or overlapping parts 23 and 24 which are arranged to provide double thickness decks for the pallet.

It will be realized that the various different features of the pallets illustrated can be interchanged. Other obvious arrangements and modifications will occur to those skilled in the art.

As mentioned above, where corrugated fiberboard is used, advantage can be taken of the fact that the greatest load carrying capacity of such fiberboard is in a direction parallel to the length of the corrugations. Thus, it will be obvious, as is the case with the runner reinforcements, that the components of the pallet in general may be made where corrugated fiberboard is employed so that the corrugations of the fiberboard are disposed to take advantage of their maximum weight carrying ability. In other words, pallets are so constructed that in all vertically disposed parts, the corrugations are also vertical.

Depending upon the weight and distribution of the load to be supported, the runner reinforcements can occupy all or only a portion of the runner channels. Thus, particularly where a load is evenly distributed, a portion of the runner may be left unfilled, the reinforcement being located at the ends of the runner and optionally at spaced portions within the runner. A pallet of the general construction shown in FIGURE 1, except that the fiberboard reinforcements within the two inch square runners was vertically disposed and extended about six inches from each end of each runner and having a deck area of 40 inches by 48 inches, is capable of supporting a load of 1500 pounds in motor truck or rail transit without failure.

What I claim as new and desire to secure by Letters Patent of the United States is:

1. A corrugated fiberboard pallet comprising
   (a) an inner, generally planar fiberboard structure,
   (b) a plurality of runners comprising channels integrally formed in said structure and extending along one dimension of said inner structure,
   (c) reinforcement strips of laid-up bonded corrugated fiberboard filling the entire space within said runners, said reinforcement strips and their corrugations being vertically disposed with respect to said structure to increase its load-bearing capacity, (d) an outer fiberboard envelope comprising two overfolded parts, having double thicknesses at their edges, fixed to and surrounding said inner structure transverse to the length of said runners to form upper and lower decks.

References Cited

UNITED STATES PATENTS

| | | | |
|---|---|---|---|
| 2,388,730 | 11/1945 | Fallert | 108—57 |
| 2,446,914 | 8/1948 | Fallert et al. | 108—57 |
| 2,494,730 | 1/1950 | Thursby | 108—55 XR |
| 2,559,930 | 7/1951 | Bolton et al. | 108—57 |
| 2,728,545 | 12/1955 | Hermitage | 108—56 |
| 2,957,668 | 10/1960 | Norquist et al. | 108—56 |
| 3,000,603 | 9/1961 | Hemann | 108—56 |
| 3,026,015 | 3/1962 | Severn | 108—56 XR |
| 3,216,376 | 11/1965 | Anderson et al. | 108—56 |
| 2,444,183 | 6/1948 | Cahners | 108—56 |

BOBBY R. GAY, Primary Examiner

G. O. FINCH, Assistant Examiner

U.S. Cl. X.R.

108—51